United States Patent
Searcy et al.

(10) Patent No.: US 9,541,639 B2
(45) Date of Patent: Jan. 10, 2017

(54) MIMO ANTENNA WITH ELEVATION DETECTION

(71) Applicant: DELPHI TECHNOLOGIES, INC., Troy, MI (US)

(72) Inventors: James F. Searcy, Westfield, IN (US); Stephen W. Alland, Newbury Park, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/880,376

(22) Filed: Oct. 12, 2015

(65) Prior Publication Data

US 2016/0033632 A1    Feb. 4, 2016

Related U.S. Application Data

(63) Continuation-in-part of application No. 14/197,404, filed on Mar. 5, 2014.

(51) Int. Cl.
*G01S 13/44*       (2006.01)
*H01Q 21/08*      (2006.01)
(Continued)

(52) U.S. Cl.
CPC .............. *G01S 13/4454* (2013.01); *G01S 7/03* (2013.01); *G01S 7/2813* (2013.01); *G01S 7/2925* (2013.01);
(Continued)

(58) Field of Classification Search
CPC ...................................................... H01Q 21/08
See application file for complete search history.

(56) References Cited

U.S. PATENT DOCUMENTS 4,342,997 A *  8/1982  Evans .................... H01Q 25/00
                                                              342/123
6,750,810 B2 *  6/2004  Shinoda .............. G01S 13/4463
                                                              342/149
(Continued)

FOREIGN PATENT DOCUMENTS

DE        102011113015 A1 *  3/2013   ............. G01S 7/032
EP           0 947 852 A1     10/1999
(Continued)

*Primary Examiner* — Matthew M Barker
(74) *Attorney, Agent, or Firm* — Lawrence D. Hazelton (57) ABSTRACT

A multiple input multiple output (MIMO) antenna for a radar system includes a receive antenna, a first transmit-antenna-arrangement, and a second transmit-antenna-arrangement. The receive-antenna is configured to detect radar-signals reflected by a target toward the receive-antenna. The first transmit-antenna-arrangement includes a first vertical-array of radiator elements and a second vertical-array of radiator elements. The first transmit-antenna-arrangement is configured so the first vertical-array can be selectively coupled to a transmitter independent of the second vertical-array. The second transmit-antenna-arrangement includes a third vertical-array of radiator elements and a fourth vertical-array of radiator elements. The second transmit-antenna-arrangement is configured so the third vertical-array can be selectively coupled to a transmitter independent of the fourth vertical-array. The second transmit-antenna-arrangement is vertically offset from the first transmit-antenna-arrangement by a vertical offset distance selected so an elevation angle to the target can be determined by the receive-antenna.

1 Claim, 10 Drawing Sheets

(51) Int. Cl.
*G01S 7/03* (2006.01)
*G01S 7/28* (2006.01)
*G01S 7/292* (2006.01)
*G01S 7/35* (2006.01)
*G01S 13/00* (2006.01)
*G01S 13/42* (2006.01)
*G01S 13/93* (2006.01)
*H01Q 21/06* (2006.01)
*H01Q 1/32* (2006.01)

(52) U.S. Cl.
CPC .............. *G01S 7/354* (2013.01); *G01S 13/003* (2013.01); *G01S 13/424* (2013.01); *G01S 13/931* (2013.01); *H01Q 1/3233* (2013.01); *H01Q 21/065* (2013.01); *H01Q 21/08* (2013.01)

(56) References Cited

U.S. PATENT DOCUMENTS

| | | | | |
|---|---|---|---|---|
| 7,132,976 B2* | 11/2006 | Shinoda | ................ | G01S 7/2925 342/118 |
| 7,272,472 B1* | 9/2007 | McElreath | ............ | G01S 5/0289 701/3 |
| 7,986,260 B2* | 7/2011 | McMakin | ............... | G01S 7/026 342/175 |
| 8,289,203 B2* | 10/2012 | Culkin | ................. | H01Q 21/061 342/117 |
| 8,432,307 B2* | 4/2013 | Cornic | ................. | G01S 13/424 342/118 |
| 8,436,763 B2* | 5/2013 | Wintermantel | ......... | G01S 7/032 342/70 |
| 8,466,829 B1* | 6/2013 | Volman | ..................... | G01S 3/48 342/133 |
| 8,665,137 B2* | 3/2014 | Wintermantel | ......... | G01S 7/032 342/188 |
| 8,717,224 B2* | 5/2014 | Jeong | .................. | G01S 13/4463 342/70 |
| 8,797,208 B2* | 8/2014 | Stirling-Gallacher | .. | G01S 13/34 342/179 |
| 9,041,587 B2* | 5/2015 | Longstaff | .............. | G01S 13/882 342/179 |
| 9,121,943 B2* | 9/2015 | Stirling-Gallacher | .. | G01S 13/89 |
| 9,203,160 B2* | 12/2015 | Blech | .................... | H01Q 21/08 |
| 2010/0123616 A1* | 5/2010 | Minami | ................. | G01S 7/4021 342/147 |
| 2011/0074620 A1* | 3/2011 | Wintermantel | ......... | G01S 7/032 342/70 |
| 2011/0140952 A1 | 6/2011 | Kemkemian et al. | | |
| 2014/0104097 A1* | 4/2014 | Binzer | ................. | G01S 13/931 342/74 |
| 2014/0306840 A1* | 10/2014 | Koerber | ................. | G01S 7/032 342/107 |

FOREIGN PATENT DOCUMENTS

| | | | |
|---|---|---|---|
| KR | 2013 0115510 A | 10/2013 | |
| WO | 2010/095946 A1 | 8/2010 | |
| WO | WO 2013124969 A1 * | 8/2013 | ............. G01S 7/032 |

* cited by examiner

MIMO ANTENNA WITH ELEVATION DETECTION

CROSS-REFERENCE TO RELATED APPLICATION

This application is a continuation-in-part application that claims the benefit of U.S. patent application Ser. No. 14/197,404, entitled MIMO ANTENNA WITH ELEVATION DETECTION, and filed on Mar. 5, 2014, the entire disclosure of which is hereby incorporated herein by reference.

TECHNICAL FIELD OF INVENTION

This disclosure generally relates to input multiple output (MIMO) antenna for a radar system, and more particularly relates to vertically offsetting one transmit-antenna from another so an elevation angle to a target can be determined.

BACKGROUND OF INVENTION

Many ground vehicle (e.g. automotive) radar systems in use today are only able to determine distance and a horizontal or azimuth angle to a target or object. The transmit-antenna and receive antenna for such a system are typically vertical arrays of radiator and detector elements or patches, respectively. However, it has been recognized that it is desirable to determine a vertical or elevation angle to the object so elevated objects such as a bridge or building overhang is not inadvertently designated as object that is in the travel path of the vehicle.

As automotive radar systems are especially sensitive to cost factors, the number of transmit-antenna outputs and receive-antenna inputs is generally held to a minimum. The number of transmit-antennas and receive-antennas influences the radar spatial capability in azimuth and elevation and also drives system cost. That is, more antennas provide better capability at the expense of increased cost. Prior attempts to add elevation resolution undesirably increased number of transmit and/or receive antennas with the attendant increase in system cost. In order to increase antenna gain, the receive-antenna may have multiple strings or arrays of detector elements. Parallel arrays increase spacing between the phase-centers of the sub-arrays which leads to grating lobes that cause an undesirably large variation in receive antenna sensitivity for various azimuth angles. One way to reduce the effects of grating lobes is to provide an analog beam-former designed to overlap the sub-arrays to effectively reduce the spacing between the phase-centers of the sub-arrays. However, this approach typically requires a complex multi-layer feed structure leading to undesirable higher cost.

SUMMARY OF THE INVENTION

In accordance with one embodiment, a multiple input multiple output (MIMO) antenna for a radar system is provided. The antenna includes a receive antenna, a first transmit-antenna-arrangement, and a second transmit-antenna-arrangement. The receive-antenna is configured to detect radar-signals reflected by a target toward the receive-antenna. The first transmit-antenna-arrangement includes a first vertical-array of radiator elements and a second vertical-array of radiator elements. The first transmit-antenna-arrangement is configured so the first vertical-array can be selectively coupled to a transmitter independent of the second vertical-array. The second transmit-antenna-arrangement includes a third vertical-array of radiator elements and a fourth vertical-array of radiator elements. The second transmit-antenna-arrangement is configured so the third vertical-array can be selectively coupled to a transmitter independent of the fourth vertical-array. The second transmit-antenna-arrangement is vertically offset from the first transmit-antenna-arrangement by a vertical offset distance selected so an elevation angle to the target can be determined by the receive-antenna.

In another embodiment, a transmit-portion of a multiple input multiple output (MIMO) antenna for a radar system is provided. The transmit-portion includes only a first transmit-antenna-arrangement and a second transmit-antenna-arrangement. The first transmit-antenna-arrangement that includes only a first vertical-array of radiator elements and a second vertical-array of radiator elements. The first transmit-antenna-arrangement is configured so the first vertical-array can be selectively coupled to a transmitter independent of the second vertical-array. The second transmit-antenna-arrangement that includes only a third vertical-array of radiator elements and a fourth vertical-array of radiator elements. The second transmit-antenna-arrangement is configured so the third vertical-array can be selectively coupled to a transmitter independent of the fourth vertical-array. The second transmit-antenna-arrangement is vertically offset from the first transmit-antenna-arrangement by a vertical offset distance selected so an elevation angle to the target can be determined by the receive-antenna.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

In general, multiple input, multiple output (MIMO) antenna architectures provide for electronic scanning with improved spatial coverage and resolution. MIMO operation typically requires multiple transmit and multiple receive antennas along with multiple transmitters and receivers. However, the teachings presented herein may also be applicable to a simpler receive antenna configuration, for example, a single receive antenna consisting of a single element. Described herein are various configurations of MIMO antennas where the number of transmit and receive antennas depends on the spatial coverage and resolution required in both the azimuth (horizontal) and elevation (vertical) dimensions. The number of transmitters and receivers can equal the number of transmit and receive antennas, or a fewer number can be timeshared between the respective transmit and/or receiver antennas. However, for best performance, parallel transmit and receive channels are used, one channel per antenna, rather than timesharing.

The number of transmit and receive antennas influences the radar spatial capability in azimuth and elevation, and also influences system cost. In general, more antennas provide better capability at the expense of increased cost. As will be explained in more detail, an antenna or system that provides suitable azimuth resolution can be reconfigured in a straightforward manner to add elevation resolution. That is, some configurations of the MIMO antenna described herein provide both azimuth and elevation resolution without increasing the number of transmit or receive antennas when compared to a configuration that provides only azimuth (or only elevation) resolution and also provides an acceptable grating lobe characteristic. In other words, starting with a configuration that provides sufficient azimuth resolution, the improvement described herein adds some degree of elevation resolution without increasing the number of transmit (TX) antennas or receive (RX) antennas.

Another aspect of some of the MIMO configurations described herein is directed to the spacing of multiple TX and RX antennas in the horizontal dimension which simultaneously provides for higher gain antennas and half wavelength spacing of the virtual synthetic array to avoid grating lobes. Larger, higher gain antennas offer better detection range and higher spatial resolution than small, lower gain antennas. To avoid grating lobes, the vertical arrays that form the TX and RX antennas are typically required to be spaced by a half-wavelength. Hence, larger antennas with either MIMO or conventional digital beam-forming architectures require additional TX and/or RX channels (higher cost) for half-wavelength spacing to avoid grating lobes.

Another aspect of the MIMO antenna configurations described herein includes a MIMO antenna configuration to double the size of both the TX and RX antennas with resulting 50% overlap of the sub-arrays of the virtual array without a separate analog feed structure. The increased size of the TX and RX antennas improves detection range and spatial resolution. In the particular configuration used, 50% overlap of the sub-arrays yields half wavelength spacing of the vertical arrays to form a virtual-receive antenna that altogether eliminates grating lobes.

Figure 7A:
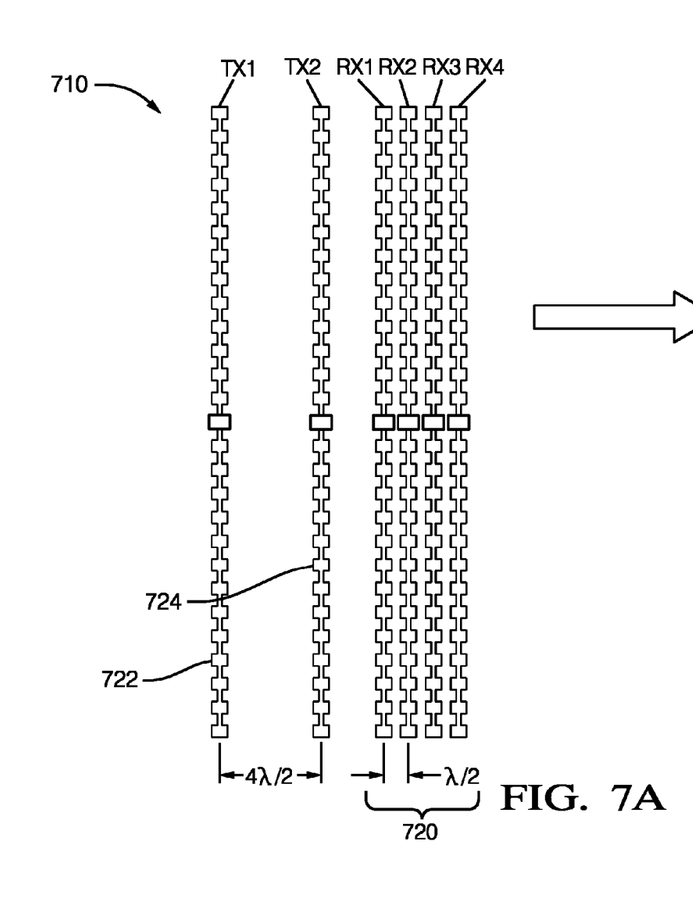
FIG. 7A is a MIMO antenna for a radar system in accordance with one embodiment.
Figure 7B:
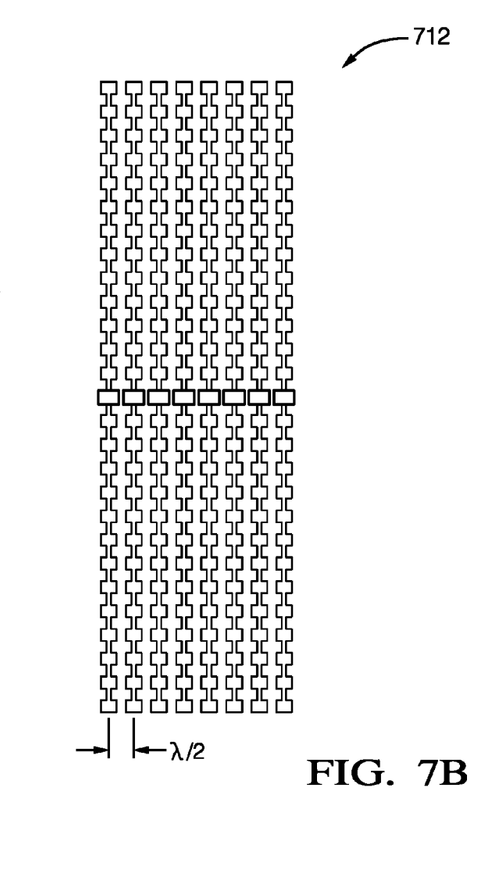
FIG. 7B is an effective equivalent virtual-receive antenna arising from the configuration of MIMO antenna of FIG. 7A.

FIGS. 7A and 7B illustrates a non-limiting example of a MIMO antenna 710, and a virtual-receive antenna 712 that illustrates the equivalent performance of the receive-antenna 720 realized by cooperating with the first transmit-antenna 722 and the second transmit-antenna 724. That is, the six vertical arrays that form the receive-antenna 720, the first transmit-antenna 722 and the second transmit-antenna 724 can provide the same gain and azimuth detection characteristics as the virtual-receive antenna 712 when a single transmit-antenna (not shown) is used. It should be appreciated that the MIMO antenna 710 needs two transmitters and four receivers to operate (assuming that the transmitters and receiver are not being multiplexed or otherwise time shared) to provide the same performance as one transmitter and eight receivers connected to the virtual-receive antenna 712.

Because the four receive arrays (RX1, RX2, RX3, RX4) are each single element arrays (i.e. have a single string of detector elements), the four receive arrays can be physically spaced apart by one-half wavelength ($\lambda/2$). By horizontally spacing the first transmit-antenna 722 two wavelengths ($4\lambda/2$) apart from the second transmit-antenna 724, the virtual-receive antenna has eight single element arrays with one half wavelength spacing as shown. Hence, the resulting virtual-receive antenna 712 is effectively twice the width of the receive-antenna 720 to thereby improve the effective spatial resolution of the receive-antenna 720 by a factor of two.

It is noted that the MIMO antenna 710 can be used to determine a horizontal or azimuth angle of multiple targets via digital beam-forming, but the MIMO antenna 710 is generally not useful to measure a vertical or elevation angle of a target. One approach to add elevation measurement capability would be to split the TX or RX antennas in the vertical dimension to double the number of TX or RX antennas and their respective transmit or receive channels (i.e.—a 4-TX/4-RX configuration or a 2-TX/8-RX configuration).

Continuing to refer to FIG. 7A as an example, radar detection range may be limited by the gain of the individual antennas. Increasing the height of the antennas could be an option to increase antenna gain, but height is often limited by package size constraints and/or the elevation coverage needed. The TX antennas can be increased in width by adding additional parallel vertical arrays to improve detection range, but width may be limited by the azimuth coverage needed. Similar increasing of the width of the RX antennas increases gain, but would also increase their spacing to greater than half wavelength which leads to undesired grating lobes in digital beam-forming. Another option is to increase the number of TX and/or RX antennas with subsequent increase in cost.

By way of example and not limitation, sizes or dimensions of features of the various MIMO antenna described herein are selected for a radar frequency of $76.5*10^9$ Hertz (76.5 GHz). Those skilled in the art will recognize that the features can be scaled or otherwise altered to adapt the antenna 710 for operation at a different radar frequency. The vertical arrays may also be known as microstrip antennas or microstrip radiators, and may be arranged on a substrate (not shown). Each vertical array may be a string or linear array of elements or patches formed of half-ounce copper foil on a 380 micrometer (μm) thick substrate such as RO5880 substrate from Rogers Corporation of Rogers, Conn. A suitable overall length of the vertical arrays is forty-eight millimeters (48 mm). The elements or patches may have a width of 1394 μm and a height of 1284 μm. The patch pitch may be one guided wavelength of the radar signal, e.g. 2560 μm, and the microstrips interconnecting each of the patches may be 503 μm wide. Preferably, the elements or patches are arranged on the surface of the substrate, and other features such as a feed network are arranged on an inner layer or backside of the substrate. It should be recognized that the various MIMO antennas illustrated herein are generally configured to transmit and detect radar signals in a direction normal to the view of the MIMO antenna presented. That is, the bore-site of each MIMO antenna is generally normal to the view presented, i.e. is normal to the page.

Figure 1A:
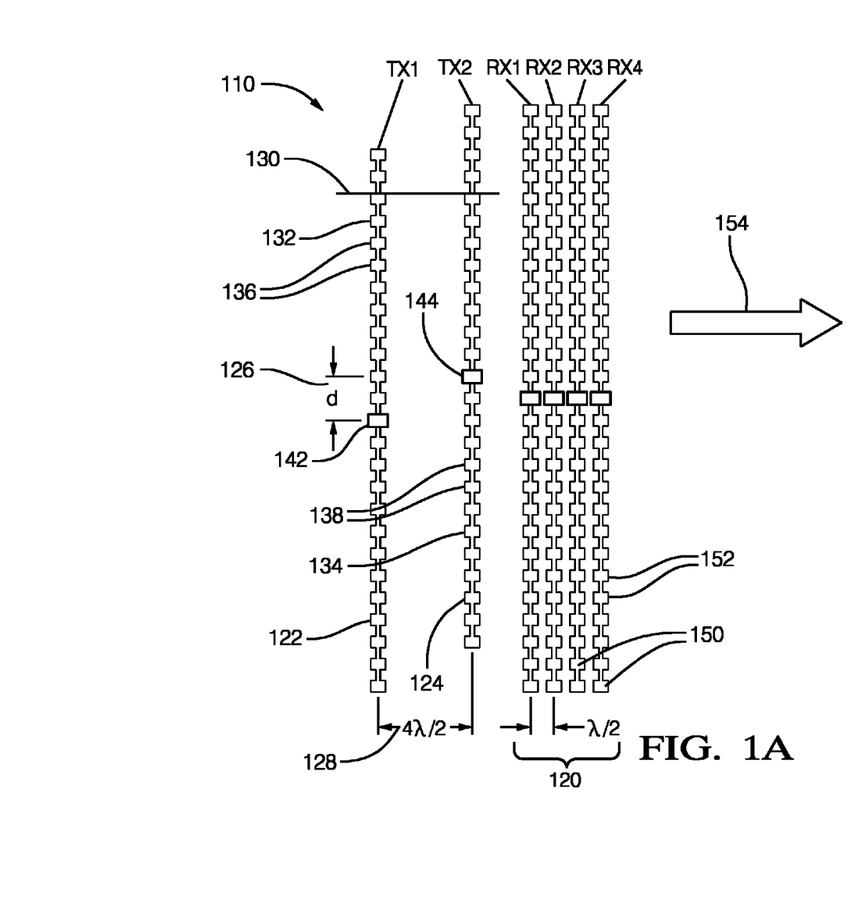
FIG. 1A is a multiple input multiple output (MIMO) antenna for a radar system in accordance with one embodiment.
Figure 1B:
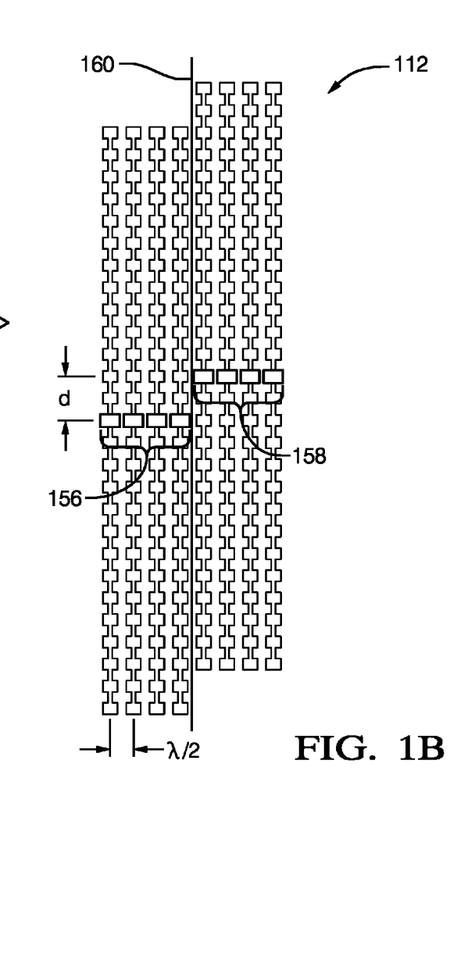
FIG. 1B is an effective equivalent virtual-receive antenna arising from the configuration of MIMO antenna of FIG. 1A.

FIGS. 1A and 1B illustrate a non-limiting example of a multiple input multiple output (MIMO) antenna, hereafter the MIMO antenna 110, for a radar system (not shown) that establishes the virtual-receive antenna 112 illustrated. The MIMO antenna 110 includes a receive-antenna 120 configured to detect radar signals (not shown) reflected by a target (not shown) toward the receive-antenna 120. The MIMO antenna 110 also includes a first transmit-antenna 122 formed of a first vertical array 132 of radiator elements 136; and a second transmit-antenna 124 formed of a second vertical array 134 of radiator elements 138 distinct (i.e. separate) from the first vertical array 132. In contrast to the example shown in FIG. 7, the second transmit-antenna 124 is vertically offset from the first transmit-antenna 122 by a vertical offset distance 126. The vertical offset distance 126 is selected so an elevation angle to the target can be determined. By way of example and not limitation, a suitable value for the vertical offset distance 126 is one-half wavelength, for example 1.96 mm for 76.5 GHz. More importantly, a first transmit phase-center 142 of the first transmit-antenna 122 is vertically offset from a second transmit phase-center 144 of the second transmit-antenna 124. As used herein, the phase-center of an antenna or array is generally located at the center of the radiated energy distribution pattern if the antenna is being used to transmit a radar signal. That the first transmit-antenna 122 and the second transmit-antenna 124 are shown to be the same configuration is only to facilitate the explanation presented herein. That is, it is contemplated that the first transmit-antenna 122 and the second transmit-antenna 124 could have different vertical lengths. In this non-limiting example, the transmit-antennas are fed a signal at the mid-point of the respective transmit antennas, and so the phase-centers of the transmit antennas are also at the mid-points. However, as will be recognized by those in the art, this is not a requirement. That is, the feeds for the antenna could be at other than a mid-point, and/or the pitch of the radiator elements could be varied so the phase-center of the antenna is at a location other than the mid-point.

As with the MIMO antenna 710 (FIG. 7), the second transmit-antenna 124 is horizontally offset from the first transmit-antenna 122 by a horizontal offset distance 128 selected so the virtual-receive antenna 112 is established as shown, thereby doubling the effective width of the receive-antenna 120, but keeping the spacing of the vertical arrays forming the virtual-receive antenna 112 at one half wavelength ($\lambda/2$).

The vertical offset distance 126 is selected so that the second transmit-antenna 124 intersects a horizontal line 130 that intersects the first transmit-antenna 122. By way of a different explanation, if the second transmit-antenna 124 was moved to the left to be in line with the first transmit-antenna 122, the second transmit-antenna 124 would vertically overlap the first transmit antenna. If the vertical offset distance 126 is too small, the elevation measurement may exhibit poor accuracy. If the vertical offset distance 126 is too large, the elevation measurement may have ambiguities. The vertical overlap itself is not required; it's just a result of the vertical size of the TX antennas compared to the vertical offset. For example, the TX antennas shown are about 12 wavelengths tall while a representative vertical offset would be one half to one wavelength. In other situations the TX antennas could each be a single patch and then the vertical offset would not result in any vertical overlap.

Similar to the various MIMO antenna described herein, the receive-antenna 120 (and other examples of receive-antennas described herein) includes one or more vertical arrays 150 of detector elements 152. The first transmit-antenna 122, the second transmit-antenna 124, and the receive-antenna 120 cooperate to establish, as suggested by the arrow 154, the virtual-receive antenna 112. The virtual-receive antenna 112 is a representation of a receive antenna that has the same performance as, i.e. is equivalent to, the MIMO antenna 110 from which it is established. That is, the virtual-receive antenna 112 receiving a reflected radar signal from only a single transmit-antenna (not show) has the same or equivalent performance characteristics as the MIMO antenna 110.

The virtual-receive antenna 112 can be further characterized by noting that the first transmit-antenna 122 and the receive-antenna 120 cooperate to establish a first group of phase-centers 156. Similarly, the second transmit-antenna 124 and the receive-antenna 120 cooperate to establish a second group of phase-centers 158. It should be understood that these groups of phase centers are virtual phase centers of the virtual-receive antenna 112. As a result of the vertical offset of the second transmit-antenna 124 relative to the first transmit-antenna 122, the second group of phase-centers 158 is vertically offset from the first group of phase-centers 156. As such, elevation measurement capability is added by offsetting or displacing the second transmit-antenna 124 relative to the first transmit-antenna 122 in the vertical direction as shown. The phase offset between the virtual phase centers is related to the elevation angle of the target relative to the bore site of the MIMO antenna by the relationship $\Delta\Phi=2\pi(d/\lambda)\sin\emptyset$, where the target elevation angle $\emptyset$ can be determined by the phase offset $\Delta\Phi$.

Because the receive-antenna 120 is formed of parallel instances of single strings of detector elements 152, the spacing of the vertical arrays 150 can be one-half wavelength. As such, acceptable azimuth performance with minimal lobe grating effects can be achieved if the second transmit-antenna 124 is horizontally offset from the first transmit-antenna 122 by a horizontal offset distance 128 selected so the gap between the second group of phase-centers 158 and the first group of phase-centers 156 is one-half wavelength. For the example shown, the appropriate spacing between the transmit antennas is two wavelengths. In other words, grating lobes can be avoided if the horizontal spacing between all of the individual phase centers of the virtual-receive antenna is one-half wavelength. However, in FIG. 1B for example, if the two halves of the virtual array are processed together without compensating for the phase offset delta phi ($\Delta\Phi$) due to target elevation, then 'partial' grating lobes may occur to a degree that is determined by the vertical offset distance 126. It is noted that the MIMO antenna 110 (and other instances of the MIMO antenna described herein) has two transmitter inputs and four receiver inputs for a total of six inputs that must be serviced by the radar system, but this configuration provides equivalent performance of an antenna with one transmitter input and eight receiver inputs for a total of nine inputs that would need to be serviced to provide equivalent performance of the MIMO antenna 110.

Figure 2A:
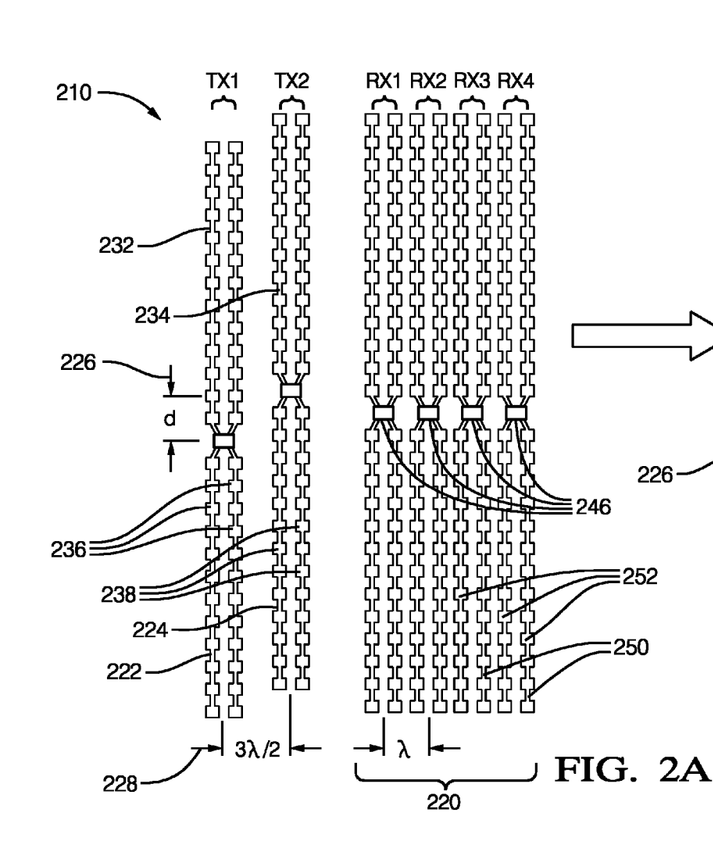
FIG. 2A is a MIMO antenna for a radar system in accordance with one embodiment.
Figure 2B:
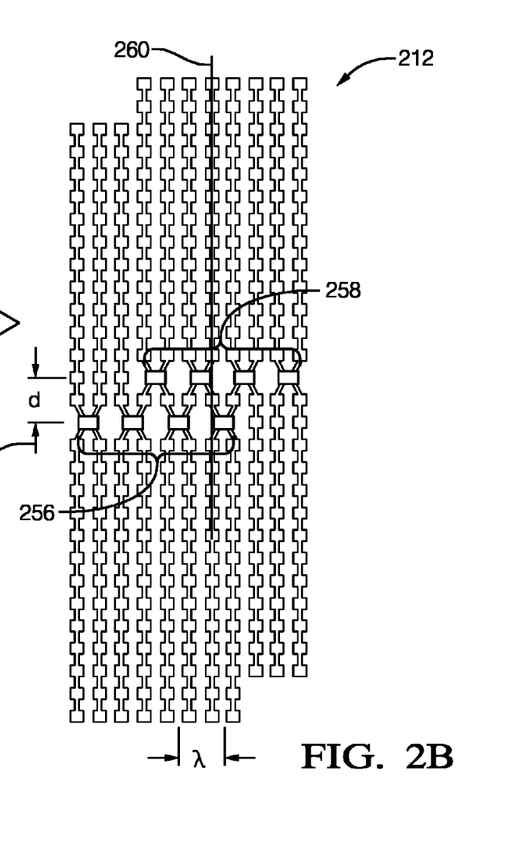
FIG. 2B is an effective equivalent virtual-receive antenna arising from the configuration of MIMO antenna of FIG. 2A.

FIGS. 2A and 2B illustrate another non-limiting example of a MIMO antenna 210 antenna that establishes the virtual-receive antenna 212 illustrated. In this non-limiting example the first transmit-antenna 222 is formed of a first paired vertical array 232 of radiator elements 236, and the second transmit-antenna 224 is formed of a second paired vertical array 234 of radiator elements 238. Similarly, the receive-antenna 220 is formed of one or more paired vertical arrays 250 formed of detector elements 252. Paired vertical arrays are advantageous with respect to the single element arrays shown in FIG. 1A because the paired vertical arrays have greater antenna gain. However, because of the additional width, the phase centers 246 of the receive-antenna 220 are spaced apart by one wavelength ($\lambda$) instead of the preferred one-half wavelength ($\lambda/2$) as is the case for the MIMO antenna 110 shown in FIG. 1. Typically, one-wavelength spacing would lead to undesirable grating lobe characteristics.

In order to improve the grating lobe characteristics, the horizontal offset distance 228 is selected so the second group of phase-centers 258 intersects a vertical line 260 that intersects the first group of phase-centers 256. By way of an alternative description, if the vertical offset distance 226 (d) were zero, the second group of phase-centers 258 would horizontally overlap the first group of phase-centers 256. The horizontal offset distance 228 can be further selected so the first group of phase-centers 256 is interleaved with the second group of phase-centers 258. In particular, the interleaving can be such that at least some of the first group of phase-centers 256 cooperates with the second group of phase-centers 258 so that the virtual-receive antenna 212 has some (preferably most) of the phase centers horizontally spaced apart by one-half wavelength ($\lambda/2$) in order to improve the grating lobe characteristics of the MIMO antenna 210. For the example shown, the appropriate spacing between the transmit antennas is 1.5 wavelengths. In this case most of the phase centers are spaced by one-half wavelength in the horizontal direction while the spacing of the last phase center on either side of the virtual array is spaced by one wavelength. This would result in "partial" grating lobes but even this effect can be mitigated by interpolation techniques.

Once target elevation is determined, the phase offset delta phi ($\Delta\Phi$) induced by target elevation (illustrated for example in FIGS. 3A and 3B) can be corrected prior to digital beam-forming in azimuth in order to eliminate or minimize grating lobes for configurations similar to those of FIG. 1 and FIG. 4 where the horizontal spacing is one-half wavelength for all phase centers. Referring to FIG. 2, the phase-centers (256,258) of the resulting virtual-receive antenna 212 are arranged to form a triangular pattern. The vertical offset of the phase-centers provides capability to measure target elevation angle using a phase comparison approach. The horizontal spacing of vertically aligned phase-centers is equal to one wavelength which would typically lead to grating lobes in subsequent azimuth beam-forming. This triangular spacing provides some degree of grating lobes suppression since, when projecting to the horizontal dimension, the phase-center spacing is equal to one-half wavelength. In essence, with triangular spacing, the grating lobes are displaced off the principal plane and reduced in amplitude by amounts depending on the vertical offset distance 226 of the TX antennas (222, 224). This aspect of grating lobe suppression (by displacing off the principle plane and reducing in amplitude) is provided without any correction for the target elevation induced phase offset. If the phase offset delta phi ($\Delta\Phi$) is corrected, the grating lobes are suppressed. However, there are issues that will, in practice, limit the suppression. First, the correction is generally only valid for a single target in a range-Doppler bin. However, the technique described to estimate elevation from phase offset delta phi only generally works for a single target in a range-Doppler bin as well.

Figure 3A:
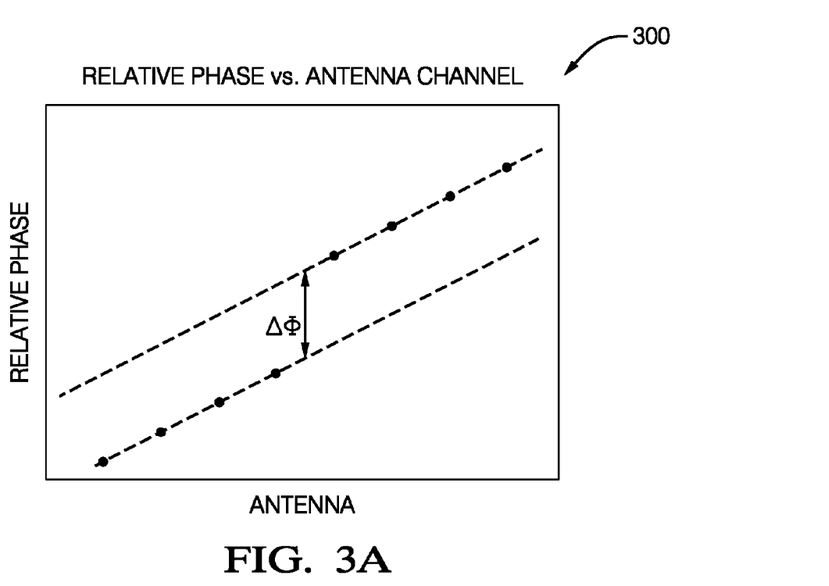
FIG. 3A is a graph of a performance characteristic of the MIMO antenna of FIG. 1A in accordance with one embodiment.

FIG. 3A is a graph 300 of the relative phase of each of the phase centers that form the virtual-receive antenna 112 where, given a single target in a range-Doppler bin, the relative phase of each vertical array of the virtual-receive antenna 112 is illustrated. The slope of the linear phase progression is related to target azimuth. The phase offset between the virtual phase centers is related to the elevation angle of the target relative to the bore site of the MIMO antenna by the relationship $\Delta\Phi=2\pi(d/\kappa) \sin \emptyset$, where the target elevation angle $\emptyset$ can be determined by the phase offset $\Delta\Phi$. As discussed above, once target elevation is determined, the phase offset $\Delta\Phi$ can be corrected prior to digital beam-forming in azimuth in order to eliminate grating lobes altogether.

Figure 3B:
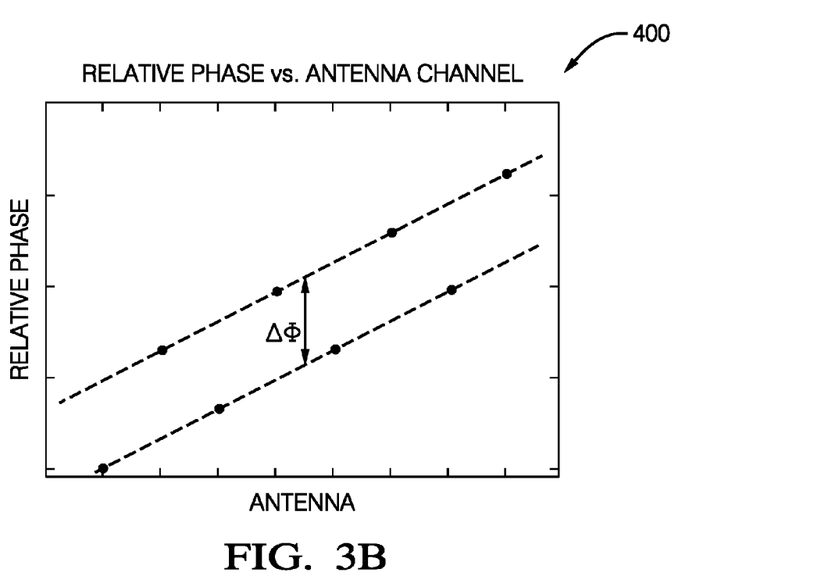
FIG. 3B is a graph of a performance characteristic of the MIMO antenna of FIG. 4A in accordance with one embodiment.

FIG. 3B is a graph 400 of the relative phase of each of the phase centers that form the virtual-receive antenna 412 (FIG. 4B) where, given a single target in a range-Doppler bin, the relative phase of each vertical array of the virtual-receive antenna 412 is illustrated. As describe before, the slope of the linear phase progression is related to target azimuth. The phase offset between the virtual phase centers is related to the elevation angle of the target relative to the bore site of the MIMO antenna by the relationship $\Delta\Phi=2\pi(d/\kappa) \sin \emptyset$, where the target elevation angle $\emptyset$ can be determined by the phase offset $\Delta\Phi$. Once target elevation is determined, the phase offset can be corrected prior to digital beam-forming in azimuth in order to eliminate grating lobes altogether. The signal received from each antenna may be characterized by a complex number indicative of amplitude and phase. To estimate target elevation, the phase offset delta phi ($\Delta\Phi$) is computed, see FIG. 3B. Computing the phase offset from the complex valued signals should be clear to those skilled in the art. Once this phase offset is known, a target elevation is calculated by solving the equation above. Then, this phase offset is subtracted from the complex valued signals from half the elements of the virtual array, for example, from every other antenna for FIG. 4B so that the corresponding phases in the FIG. 3B are shifted so the phases of all the phase centers lie along the same line. Then, digital beam-forming will form a peak at the target azimuth angle without any grating lobes.

Another technique to estimate target elevation angle is to perform digital beam-forming in azimuth with phase offset corrections for different target elevation angles. The phase offset that minimizes the grating lobe level determines the elevation angle of the target. Unlike the first technique, the second technique can work for multiple targets in the same range-Doppler bin at different azimuth and elevation angles.

Figure 4A:
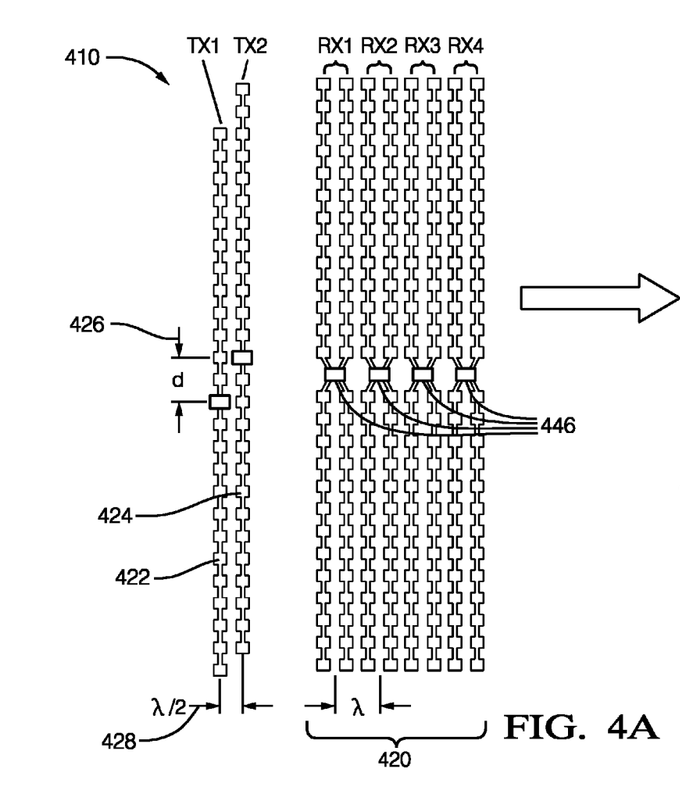
FIG. 4A is a MIMO antenna for a radar system in accordance with one embodiment.
Figure 4B:
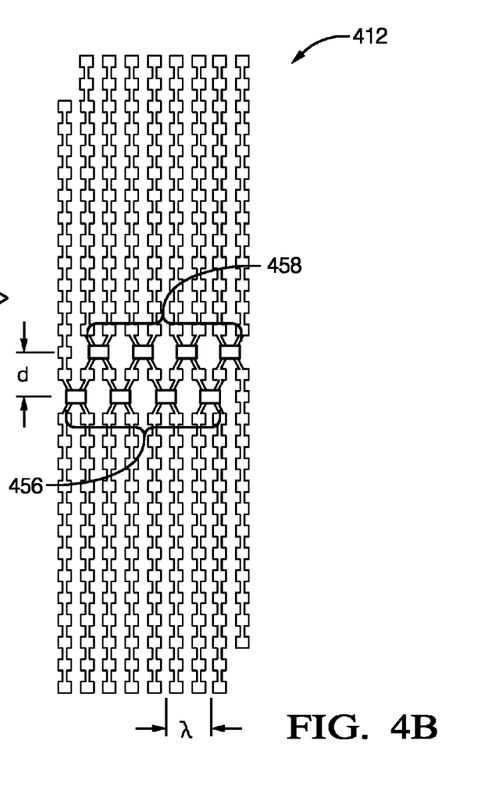
FIG. 4B is an effective equivalent virtual-receive antenna arising from the configuration of MIMO antenna of FIG. 4A.

FIGS. 4A and 4B illustrate another non-limiting example of a MIMO antenna 410 antenna that establishes the virtual-receive antenna 412 illustrated. In this non-limiting example the first transmit-antenna 422 is formed of a single vertical array, and the second transmit-antenna 424 is formed of a single vertical array. As such, the transmit antennas are comparable to those shown in FIG. 1A. Similar to FIG. 2A, the receive-antenna 420 is formed of one or more paired vertical arrays. Paired vertical arrays are advantageous with respect to the single element arrays shown in FIG. 1A because the paired vertical arrays have greater antenna gain. However, because of the additional width, the phase centers 446 of the receive-antenna 420 are spaced apart by one wavelength (λ) instead of the preferred one-half wavelength (λ/2) as is the case for the MIMO antenna 110 shown in FIG. 1. The first group of phase-centers 456 and the second group of phase centers 458 of the virtual-receive antenna 412 are arranged as indicated.

Typically, one-wavelength spacing would lead to undesirable grating lobe characteristics. However, since the transmit antennas have a horizontal offset distance 428 of one-half wavelength (λ/2), the phase center pattern of the virtual-receive antenna 412 is fully interleaved with all of the virtual-receive antenna arrays having a horizontally spacing of one-half wavelength (λ/2). The vertical offset distance 426 of the transmit antennas involves tradeoffs in elevation measurement accuracy and ambiguities as previously discussed. To avoid ambiguity in estimating target elevation angle, the vertical offset distance can be selected to be one-half wavelength (λ/2).

The MIMO antennas described thus far have been configured to provide elevation angle detection by vertically offsetting the transmit antennas. However, if there is no desire for elevation angle detection, the features that provide for improved grating lobe characteristics can still be utilized when the vertical offset distance is set to zero.

Figure 5A:
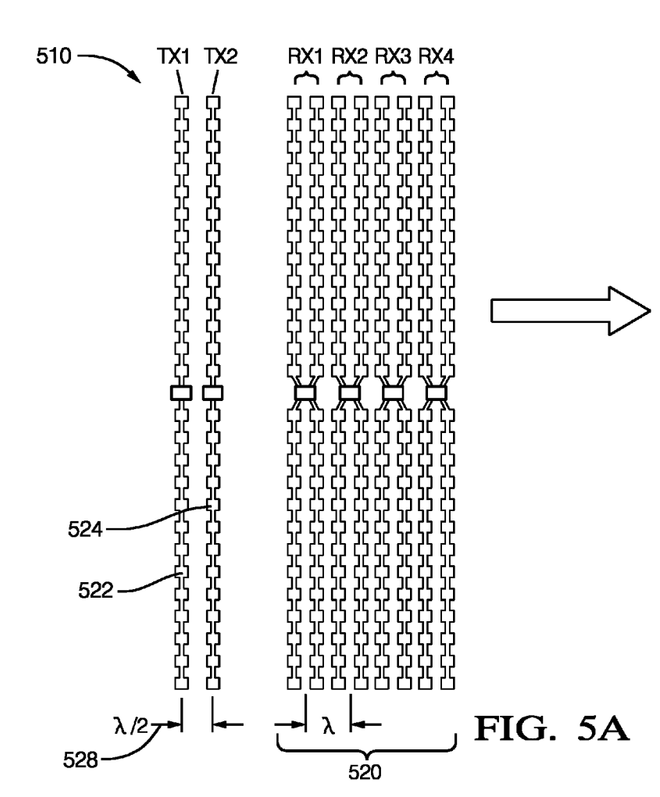
FIG. 5A is a MIMO antenna for a radar system in accordance with one embodiment.
Figure 5B:
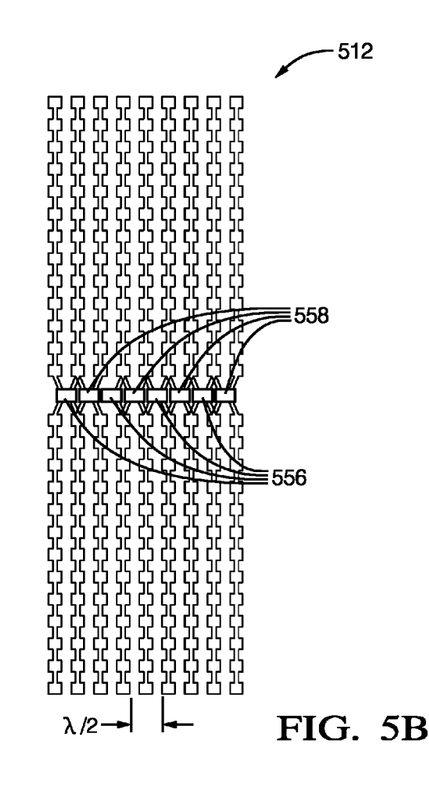
FIG. 5B is an effective equivalent virtual-receive antenna arising from the configuration of MIMO antenna of FIG. 5A.

FIGS. 5A and 5B illustrate another non-limiting example of a MIMO antenna 510 antenna that establishes the virtual-receive antenna 512 illustrated. The MIMO antenna 510 includes a first transmit-antenna 522 configured to emit a first radar signal (not shown) toward a target (not shown). The first transmit-antenna in this example is formed of a first vertical array of radiator elements that is a single string or single vertical array of radiator elements. the MIMO antenna also includes a second transmit-antenna 524 configured to emit a second radar signal (not shown) toward the target. Similarly, the second transmit-antenna is formed of a second vertical array of radiator elements that is a single string and is distinct from the first vertical array.

The MIMO antenna 510 also includes a receive antenna 520 configured to detect radar signals reflected by a target toward the receive-antenna 520. In this example the receive-antenna 520 is formed of a plurality of paired vertical arrays of detector elements similar to the receive-antenna 220 of FIG. 2A. Paired vertical arrays are advantageous with respect to the single element arrays shown in FIG. 1A because the paired vertical arrays have greater antenna gain. However, because of the additional width, the phase centers 446 of the receive-antenna 520 are spaced apart by one wavelength (λ) instead of the preferred one-half wavelength (λ/2) as is the case for the MIMO antenna 110 shown in FIG. 1. The first group of phase-centers 556 and the second group of phase centers 558 of the virtual-receive antenna 512 are arranged as indicated.

Typically, one-wavelength spacing would lead to undesirable grating lobe characteristics. However, since the transmit antennas have a horizontal offset distance 528 of one-half wavelength (λ/2), the phase center pattern of the virtual-receive antenna 512 is fully interleaved with all of the virtual-receive antenna arrays having a horizontally spacing of one-half wavelength (λ/2).

Figure 6A:
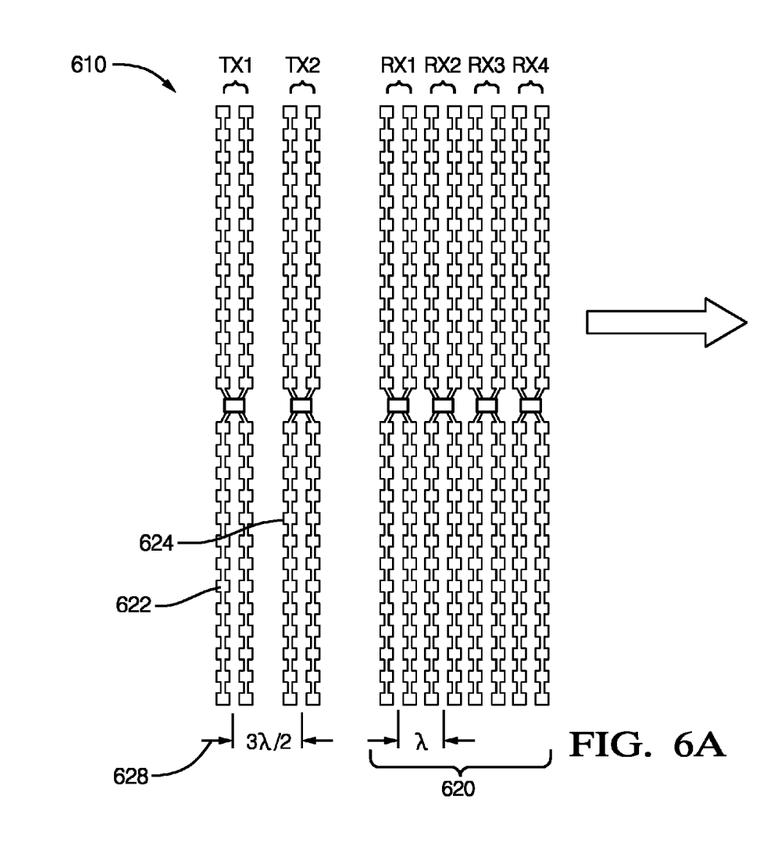
FIG. 6A is a MIMO antenna for a radar system in accordance with one embodiment.
Figure 6B:
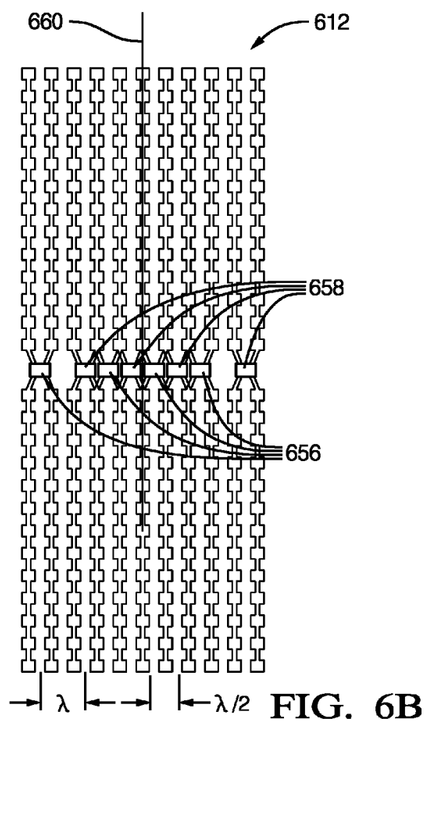
FIG. 6B is an effective equivalent virtual-receive antenna arising from the configuration of MIMO antenna of FIG. 6A.

FIGS. 6A and 6B illustrate another non-limiting example of a MIMO antenna 610 antenna that establishes the virtual-receive antenna 612 illustrated. In this non-limiting example the first transmit-antenna 622 is formed of a first paired vertical array of radiator elements, and the second transmit-antenna 624 is formed of a second paired vertical array of radiator elements. Having the transmit-antenna be formed of paired vertical arrays is advantageous as the radar signals emitted by the transmit signal are more focused along the bore site of the antenna. However, because of the additional width, horizontal offset distance 628 is increased relative to the prior example, so the transmit antennas are spaced apart by more than one-half wavelength (λ/2). As such, some of the interleaving of the virtual-receive antenna 612 is lost when compared to FIG. 5B.

Similar to prior examples, the first transmit-antenna 622, and the receive-antenna 620 cooperate to establish a first group of phase-centers 658. Similarly, the second transmit-antenna 624 and the receive-antenna 620 cooperate to establish a second group of phase-centers 658 distinct from the first group of phase-centers 656. Because the second transmit-antenna 624 is horizontally offset from the first transmit-antenna 622, the first group of phase-centers 656 is horizontally offset from the second group of phase-centers 658. Since the paired vertical arrays that form the receive-antenna 620 are spaced apart more than one-half wavelength (λ/2), the horizontal offset distance 628 may be advantageously selected so the first group of phase-centers 656 intersects a vertical line 660 that intersects the second group of phase-centers 658. In other words, the horizontal offset distance 628 may be advantageously selected so the first group of phase-centers 656 horizontally overlaps the second group of phase-centers 658.

The horizontal offset distance 628 may also be advantageously selected so the first group of phase-centers 656 is interleaved with the second group of phase-centers 658 as opposed to having a phase center of one group coincide with a phase center from the other group. In general, the radar signals emitted by the transmit-antenna may be characterized by a wavelength. Preferably, each of the plurality of paired vertical arrays that form the receive-antenna 620 is horizontally spaced apart by one wavelength, and the horizontal offset distance 628 is selected so at least some of the phase-centers of the virtual-receive antenna 612 are horizontally spaced apart by one-half wavelength.

Figure 8A:
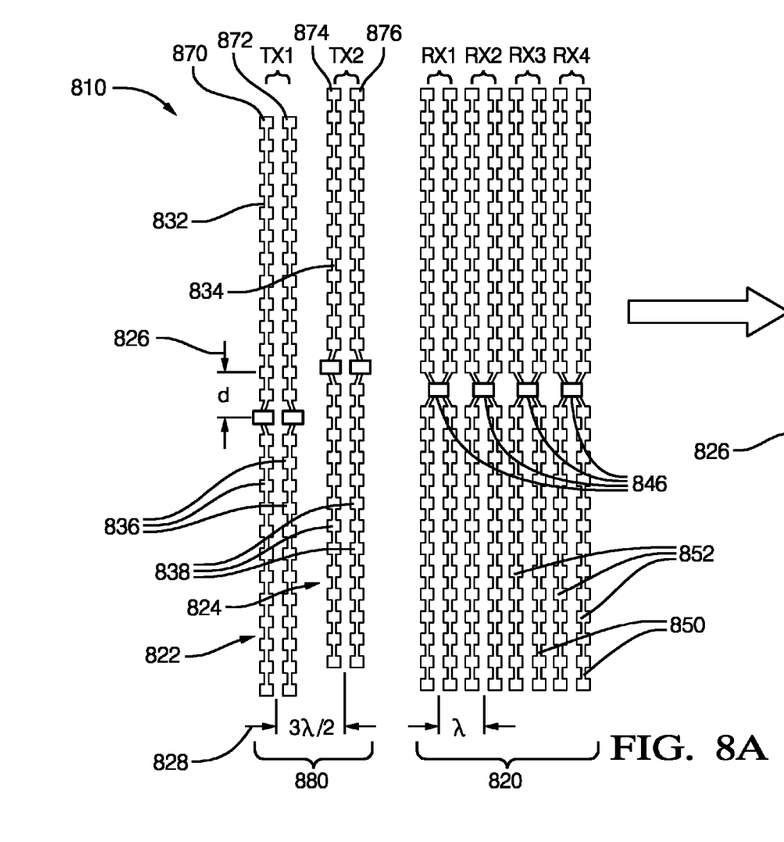
FIG. 8A is a MIMO antenna for a radar system in accordance with one embodiment.
Figure 8B:
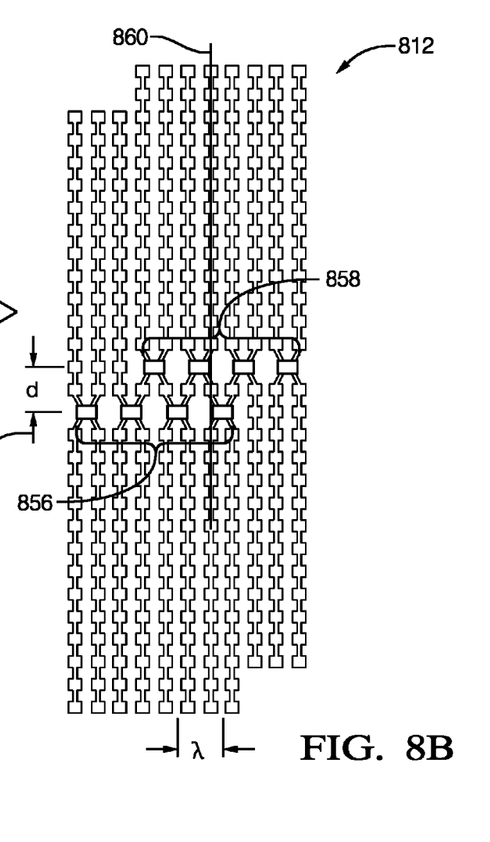
FIG. 8B is an effective equivalent virtual-receive antenna arising from the configuration of MIMO antenna of FIG. 7A.

FIGS. 8A and 8B illustrate another non-limiting example of a MIMO antenna 810 antenna that establishes the virtual-receive antenna 812 illustrated. In this non-limiting example, TX1 of a transmit-portion 880 of the MIMO antenna 810 is a first transmit-antenna-arrangement 822 formed of a first pair of single vertical arrays 832 of radiator elements 836, and the second transmit-antenna 824 is formed of a second pair of single vertical arrays 834 of radiator elements 838. Similarly, the receive-antenna 820 is formed of one or more paired vertical arrays 850 formed of detector elements 852. Paired vertical arrays are advantageous with respect to the single element arrays shown in FIG. 1A because the paired vertical arrays have greater antenna gain. However, because of the additional width, the phase centers 846 of the receive-antenna 820 are spaced apart by one wavelength (λ) instead of the preferred one-half wavelength (λ/2) as is the case for the MIMO antenna 110 shown in FIG. 1. Typically, one-wavelength spacing would lead to undesirable grating lobe characteristics. Transmit-antenna-arrangements with more than two vertical arrays are contemplated with one or more of the vertical arrays in each arrangement selectively coupled to the transmitter.

The first transmit-antenna-arrangement 822 includes a first vertical-array 870 of radiator elements and a second vertical-array 872 of radiator elements. The first transmit-antenna-arrangement 822 is configured so the first vertical-array 870 can be selectively coupled to a transmitter 910 (FIG. 9) independent of the second vertical-array 872 being coupled to the transmitter 910. Similarly, the second transmit-antenna-arrangement 824 includes a third vertical-array 874 of radiator elements and a fourth vertical-array 876 of radiator elements, and the second transmit-antenna-arrangement 824 is configured so the third vertical-array 874 can be selectively coupled to a transmitter 910 independent of the fourth vertical-array 876. As with prior examples, the second transmit-antenna-arrangement 824 is vertically offset from the first transmit-antenna-arrangement 822 by a vertical offset distance selected so an elevation angle to the target can be determined by the receive-antenna 820.

In order to improve the grating lobe characteristics, the horizontal offset distance 828 is selected so the second group of phase-centers 858 intersects a vertical line 860 that intersects the first group of phase-centers 856. By way of an alternative description, if the vertical offset distance 826 (d) were zero, the second group of phase-centers 858 would horizontally overlap the first group of phase-centers 856. The horizontal offset distance 828 can be further selected so the first group of phase-centers 856 is interleaved with the second group of phase-centers 858. In particular, the interleaving can be such that at least some of the first group of phase-centers 856 cooperates with the second group of phase-centers 858 so that the virtual-receive antenna 812 has some (preferably most) of the phase centers horizontally spaced apart by one-half wavelength (λ/2) in order to improve the grating lobe characteristics of the MIMO antenna 810. For the example shown, the appropriate spacing between the transmit antennas is 3.5 wavelengths. In this case most of the phase centers are spaced by one-half wavelength in the horizontal direction while the spacing of the last phase center on either side of the virtual array is spaced by one wavelength. This would result in "partial" grating lobes but even this effect can be mitigated by interpolation techniques.

Figure 9:
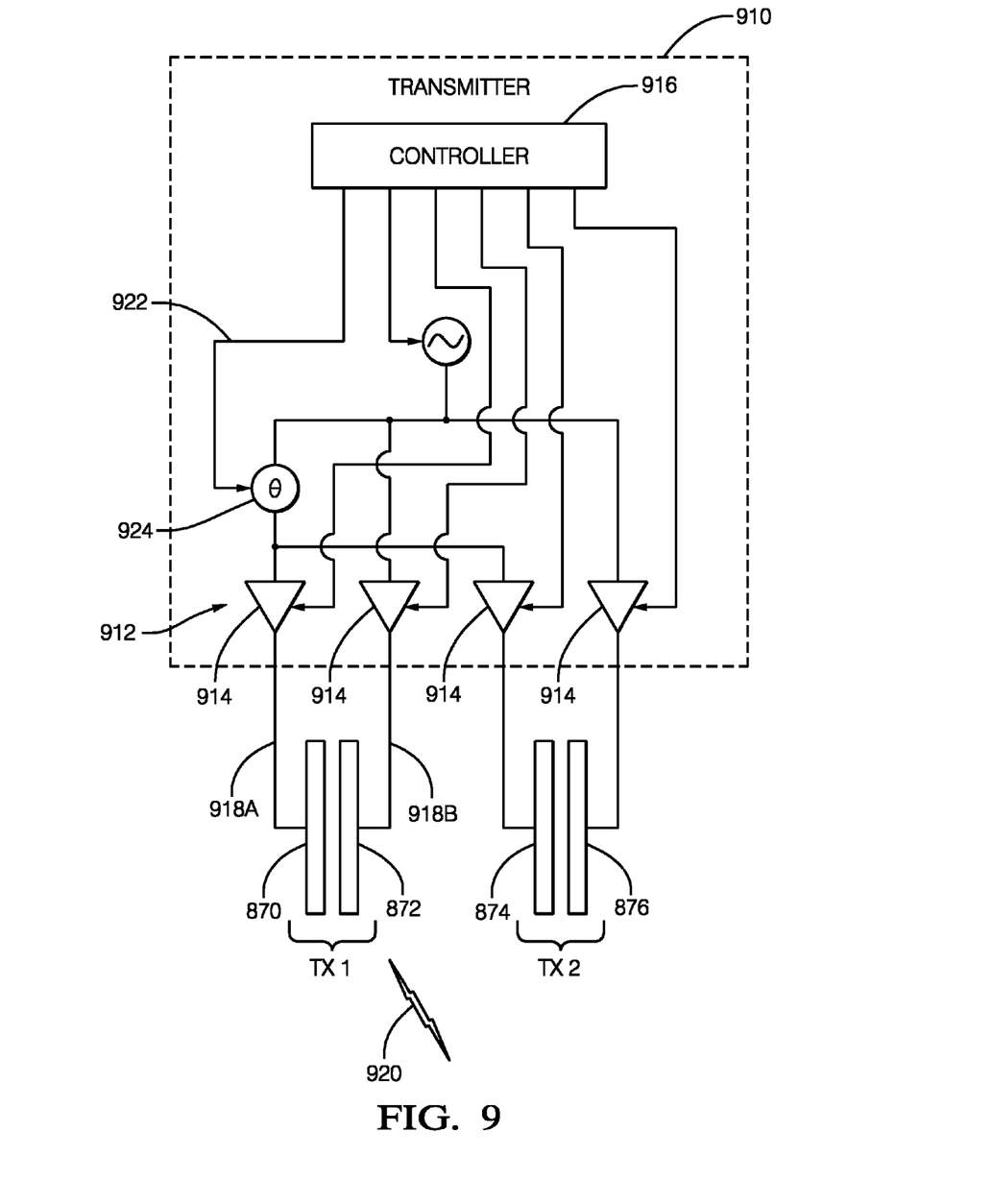
FIG. 9 is transmitter for the MIMO antenna of FIG. 7A in accordance with one embodiment.

FIG. 9 illustrates a non-limiting example of a configuration of the transmitter 910. In this example, each of the first vertical-array 870, the second vertical-array 872, the third vertical-array 874, and the fourth vertical-array 876 is driven by one of a plurality of controllable-amplifiers 912, where each of the controllable-amplifiers 912 receives a control-signal 914 from a controller 916. Each of the controllable-amplifiers 912 are preferably configured to at least be individually turned ON or OFF by the control-signal 914. Alternatively, the controllable-amplifiers 912 may be further configured so the control-signal 914 can individually vary the gain of the controllable-amplifiers 912. Given this ability to individually control the radar signal emitted by any of the vertical-arrays, the shape and/or maximum-magnitude of the radar signal emitted by the transmit-portion 880 can be varied to meet the needs of the radar system.

Figure 10:
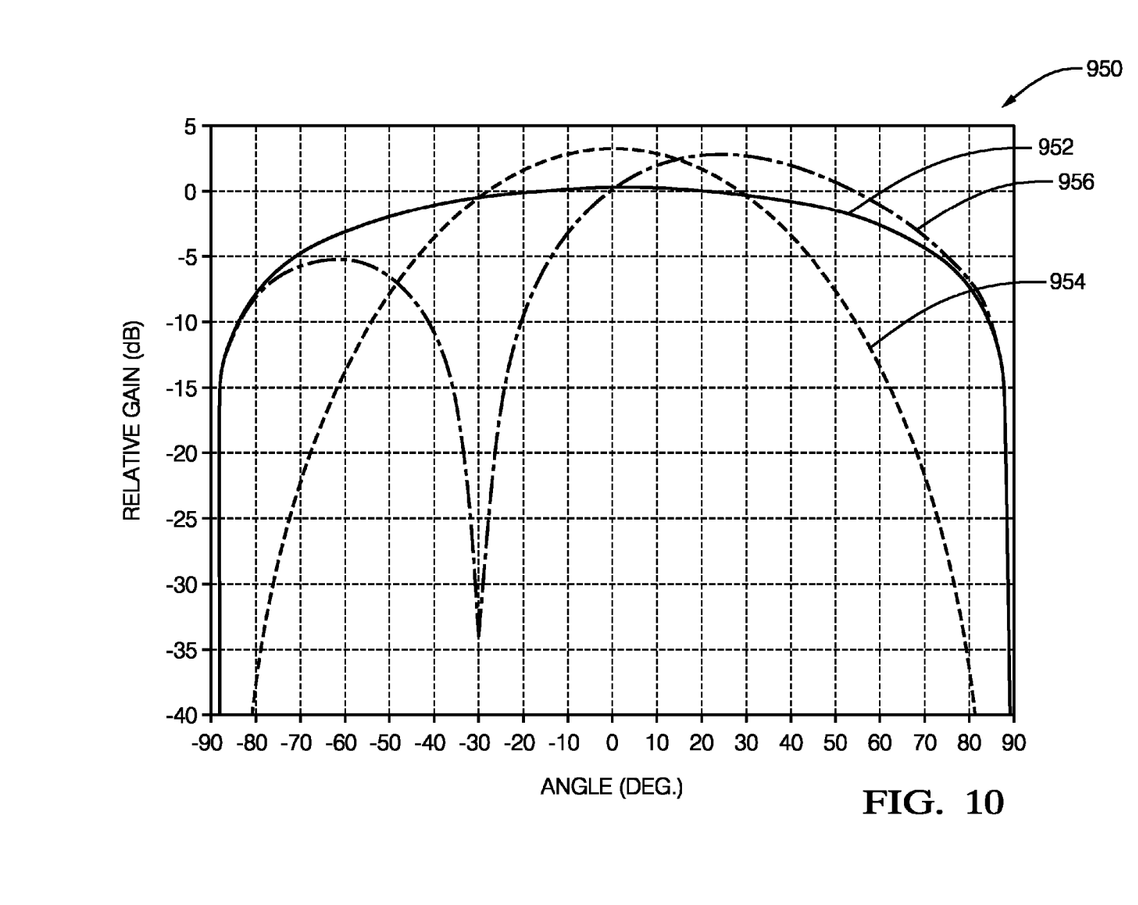
FIG. 10 is a graph of radar signal strength patterns emitted by the MIMO antenna of FIG. 7A.

FIG. 10 shows a graph 950 of non-limiting examples of signal strength patterns emitted by the transmit-portion 880 of the MIMO antenna 810. For example, the first vertical-array 870 and the second vertical-array 872 may be arranged, e.g. horizontally spaced apart, such that the transmit-portion of the antenna 810 emits radar-signals 920 characterized by a first-pattern 952 when only the first vertical-array 870 receives an excitation-signal 918A (or when only the second vertical-array 872 receives an excitation-signal 918 B), and emits radar-signals 920 characterized by a second-pattern 954 that is characterized as narrower than the first-pattern 952 when both of the first vertical-array 870 and the second vertical-array 872 receive the excitation-signals 918A and 918B, respectively. Since the radar-signals 920 from the first vertical-array 870 and the second vertical-array 872 likely combine constructively in at certain angles relative to the bore-site (i.e. 0° of angle) of the transmit-portion 880, the maximum-magnitude of the second-pattern 954 is greater than the maximum-magnitude of the first-pattern 952 at some angles.

Referring again to FIG. 9, the transmitter 910 may include a phase-shifter 924 that receives a phase-control-signal 922 from the controller 916. If the phase-shifter 924 is operated to phase-shift the excitation-signal 918A by ninety degrees of phase-angle (90° θ) relative to the excitation-signal 918B, and the transmit-portion 880 is configured as shown with a one-half-wavelength spacing between the centerlines of the first vertical-array 870 and the second vertical-array 872, the radar-signal 920 will be characterized by a third-pattern 956 that is 'steered' or focused off-axis to have a maximum-magnitude at about twenty-five degrees of boar-site-angle (25°). The ability to steer the radar-signals 920 emitted by the transmit-portion 880 is advantageous when using higher gain (narrower beam) antennas to improve detection range. Without the ability to steer the beam, the radar FOV is constrained to the beam width of the antenna centered at a fixed pointing angle. With beam steering, the radar FOV can be extended or adapted in a flexible manner. Beam steering is also advantageous when trying to distinguish multiple targets.

While configurations of more than two transmit antennas are contemplated, and transmit-antennas with more than two vertical arrays are contemplated, in one preferred embodiment, the transmit-portion of a multiple input multiple output (MIMO) antenna for a radar system consists of exactly two transmit antennas, for example the first transmit-antenna-arrangement 822 and the second transmit-antenna-arrangement 824. Such a configuration has been found to provide adequate performance and sufficient flexibility for automotive applications.

Referring again to FIG. 9, an alternative embodiment is contemplated where more or all of the plurality of controllable-amplifiers 912 receive signals from additional instances of independently controlled phase-shifters, i.e. duplicates of the phase-shifter 924. The transmitter 910 is then further configured to operate the vertical-arrays 870, 872, 874, 876 independently and in a manner that may be referred to as the digital beam forming (DBF) approach to provide orthogonality of the radar-signals emitted by each of the vertical-arrays, at least to a residue level. Techniques to transmit orthogonal signals may include, for example, time multiplexing where each vertical-array emits a radar-signal at a different time (either interleaved or non-interleaved), or phase-modulation where a different orthogonal phase code is applied to each vertical-array while operating the arrays simultaneously. Phase-modulation generally falls under the category of orthogonal waveforms. It is recognized that there are other suitable methods to transmit radar-signals from the vertical-arrays in an orthogonal manner. The various methods to control the signals transmitted by each array fall under the more general category of modulation.

Referring to FIG. 8, the controller 916 may operate each of the four vertical-arrays in an independent/orthogonal manner. If a phase modulation technique is used, an independently controlled phase-shifter would be connected to each of the four vertical-arrays. System configurations with more than four instances of the vertical-arrays (i.e. transmit-arrays) are contemplated where the radar-signals transmitted from each of the n-transmit-arrays will reflect off an object and be received by the each of the m-receive-antennas as a composite signal. The composite signal received by each receive antenna is then down-converted to baseband and sampled to produce a digital data steam. The digital data stream is input to the radar signal processor where the signals associated with each transmit vertical array are separated or recovered using a method which depends on the method used by the transmit controller to modulate the signals for each transmit array. For example, if orthogonal phase modulation is used, the radar signal processing software will implement n parallel branches for each of the m composite signals received to demodulate or recover the signals associated with each transmit array. Each of the n parallel branches will demodulate using a phase code matched to the phase code used for a specific transmit array. Following demodulation the composite signal received by each of the m receive antennas has been separated into the n signals associated with each transmit array. In the non-limiting example shown in FIG. 8, n=4 (number of transmit vertical arrays) and m=4 (number of receive antennas).

Digital beam forming (DBF) software then processes the signals associated with each transmit vertical array for each receive antenna to select the signal from one of the transmit vertical arrays from each pair or to combine the signals from both transmit vertical arrays in each pair with a phase shift to form and steer a narrower beam. In this manner, the functionality is the same as described for the method using selectable amplifiers and phase shifters connected to the transmit arrays. However, the digital beam former can do both simultaneously, that is, select one of the transmit vertical arrays from each pair and also combine the arrays from each pair with phase shift to form and steer a narrower beam. Further, the digital beam former can combine the transmit vertical arrays in each pair multiple times simultaneously with different phase shifts to steer a narrower beam to multiple angles anywhere within the antenna FOV. It should be recognized that the DBF approach described herein can do what is described in earlier descriptions of the figures, but can also do more.

Accordingly, a variety of MIMO antennas are provided. Some configurations provide for detecting an elevation angle to a target by vertically offsetting a pair of transmit antennas relative to each other. Some configurations provide for improved grating lobe characteristics when relatively wide antenna (i.e. paired vertical arrays) are used to improve gain by arranging the transmit-antenna so a virtual-receive antenna is established that provides for preferred grating lobe characteristic normally found with narrow antenna (i.e. single string arrays) that can be physically spaced apart by one-half wavelength. These features can be combined so that a MIMO antenna is provided that enjoys the increased gain provided by paired vertical arrays, but also has grating lobe characteristics comparable to those receive antennas that have single string arrays spaced apart by one-half wavelength. As noted above, this is an advantage over prior attempts to overlap sub-arrays to get half wavelength spacing using a complex, multi-layer feed network.

While this invention has been described in terms of the preferred embodiments thereof, it is not intended to be so limited, but rather only to the extent set forth in the claims that follow.

We claim:

1. A multiple input multiple output (MIMO) antenna for a radar system, said antenna consisting of:
a first transmit-antenna-arrangement that consists of a first vertical-array of radiator elements and a second vertical-array of radiator elements, said first transmit-antenna-arrangement configured so the first vertical-array can be selectively coupled to a transmitter independent of the second vertical-array; and
a second transmit-antenna-arrangement that consists of a third vertical-array of radiator elements and a fourth vertical-array of radiator elements that match the first vertical-array and the second vertical-array, said second transmit-antenna-arrangement configured so the third vertical-array can be selectively coupled to a transmitter independent of the fourth vertical-array, wherein the second transmit-antenna-arrangement is vertically offset from the first transmit-antenna-arrangement by a vertical offset distance selected so the MIMO antenna can be used to determine an elevation angle to a target, wherein the vertical offset distance is such that a horizontal line passes through both the first transmit-antenna-arrangement and the second transmit-antenna-arrangement; and
a receive-antenna configured to detect radar-signals transmitted by the first transmit-antenna-arrangement and the second transmit-antenna-arrangement and reflected by the target toward the receive-antenna, whereby the antenna can be used to determine the elevation angle based on a phase offset of radar-signals detected by the receive-antenna originating from the first transmit-antenna-arrangement and the second transmit-antenna-arrangement.

* * * * *